US008966148B2

(12) United States Patent
Campbell et al.

(10) Patent No.: US 8,966,148 B2
(45) Date of Patent: Feb. 24, 2015

(54) PROVIDING REAL-TIME INTERRUPTS OVER ETHERNET

(75) Inventors: Alexander P. Campbell, Kanata (CA); Keshav G. Kamble, Fremont (CA); Vijoy A. Pandey, San Jose (CA)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 13/487,082

(22) Filed: Jun. 1, 2012

(65) Prior Publication Data

US 2013/0322264 A1  Dec. 5, 2013

(51) Int. Cl.
*G06F 13/24* (2006.01)
*G06F 13/32* (2006.01)

(52) U.S. Cl.
CPC ............... *G06F 13/24* (2013.01); *G06F 13/32* (2013.01)
USPC .......................................... 710/260; 370/400

(58) Field of Classification Search
CPC .. H04W 24/02; H04W 52/367; H04B 7/0413; H04B 7/0691; H04B 7/0469; H04B 7/0473; H04B 7/0478; H04B 7/0486
See application file for complete search history.

(56) References Cited

U.S. PATENT DOCUMENTS

| | | | |
|---|---|---|---|
| 7,010,639 B2 | 3/2006 | Larson et al. | |
| 7,240,130 B2 | 7/2007 | Larson et al. | |
| 7,299,277 B1 | 11/2007 | Moran et al. | |
| 7,466,922 B2 | 12/2008 | Pierce et al. | |
| 7,689,756 B2 | 3/2010 | Ellison | |
| 2006/0031482 A1 | 2/2006 | Mohan et al. | |
| 2008/0209099 A1* | 8/2008 | Kloeppner et al. | 710/314 |
| 2009/0323553 A1 | 12/2009 | Hernandez et al. | |
| 2010/0185896 A1* | 7/2010 | Andres et al. | 714/5 |
| 2011/0060974 A1* | 3/2011 | Viger et al. | 714/800 |
| 2011/0069709 A1 | 3/2011 | Morris et al. | |
| 2011/0126278 A1 | 5/2011 | Volpano | |
| 2012/0008635 A1 | 1/2012 | Kuo et al. | |
| 2012/0096211 A1* | 4/2012 | Davis et al. | 710/314 |
| 2012/0246346 A1* | 9/2012 | Mach | 710/11 |
| 2013/0322290 A1 | 12/2013 | Campbell | |
| 2014/0068317 A1* | 3/2014 | Kanigicherla et al. | 714/2 |

OTHER PUBLICATIONS

U.S. Appl. No. 13/487,072, filed Jun. 1, 2012.
Restriction/Election Requirement from U.S. Appl. No. 13/487,072, filed Jan. 10, 2014.

(Continued)

*Primary Examiner* — Khaled Kassim
*Assistant Examiner* — Zhaohui Yang
(74) *Attorney, Agent, or Firm* — Zilka-Kotab, PC

(57) ABSTRACT

In one embodiment, a method includes sending a request to one or more distributed fabric protocol (DFP) system members in order to retrieve one or more events from the one or more DFP system members, wherein the one or more events are received as data encapsulated in a packet(s), receiving one or more acknowledgements to the request from the one or more DFP system members at a local network switch of the DFP system master, upon receipt of the at least one packet: decoding the at least one packet to retrieve details of the one or more events using a dedicated processor of the DFP system master, creating and sending a message signaled interrupt (MSI) comprising the details of the one or more events to a local processor of the DFP system master using the dedicated processor, and reading the MSI using the local processor of the DFP system master.

15 Claims, 7 Drawing Sheets

(56) References Cited

OTHER PUBLICATIONS

Oudjida et al., "FPGA Implementation of I2C & SPI Protocols: a Comparitive Study," 2000 IEEE, pp. 507-510.
"A Method to Improve Interrupting Efficiency for Ethernet Adapter," IBM, IPCOM000141531D, Oct. 8, 2006, pp. 1-3.
"Establishing Deterministic Behavior of Processor Sub-System for Pulses on Level Sensitive Interrupt Lines," Anonymous, IPCOM000211222D, Sep. 28, 2011, pp. 1-7.
Non-Final Office Action from U.S. Appl. No. 13/487,072 dated Jun. 6, 2014.
Notice of Allowance from U.S. Appl. No. 13/487,072, dated Oct. 14, 2014.

\* cited by examiner

PROVIDING REAL-TIME INTERRUPTS OVER ETHERNET

BACKGROUND

The present invention relates to Ethernet switches and switching, and more particularly, this invention relates to high speed scaled out distributed systems using Ethernet switches.

In cell-based distributed fabric protocol (cDFP) and/or Ethernet-based distributed fabric protocol (eDFP) scaled out systems which are capable of high-speed Ethernet (greater than 40 GbE speeds), situations arise where multiple real-time events may occur on one or more individual system members for which it would be useful or necessary to notify a system master of the occurrences of these events in real time. Such events may also require real-time response from a local processor of the individual member as well as the system master processor. Events associated with real-time reporting may include, but are not limited to, the following events: 1) a local network port link state change; 2) a local network poll transceiver insertion or removal, 3) a local system temperature or environment parameter change, 4) a local system fan tray failure, insertion, or removal, 5) a local system power supply unit failure, insertion, or removal, 6) a local system major part failure indication, 7) a local system indication of congestion of one or more mechanisms, and 8) a local system topological change indication. Of course, anything else that prompts or requires real-time response from a scaled out system master processor may also be included in this list.

In conventional distributed systems or clusters, there is no way to provide real-time interrupts over Ethernet between individual members and the system master. Accordingly, the events that require real-time reporting to the system master must be passed through some other communication protocol, which adds complexity to the infrastructure of the system and to the logic used in maintaining the system.

SUMMARY

In one embodiment, a system comprises a local processor, a peripheral component interconnect express (PCIe) switch electrically coupled to the local processor, one or more local interrupt sources adapted for creating one or more local interrupts indicating exceptions to normal operation, a dedicated processor electrically coupled to the one or more local interrupt sources and the PCIe switch, and a local network switch electrically coupled to the dedicated processor and the PCIe switch, wherein the dedicated processor is adapted for packaging the one or more local interrupts and sending the packaged interrupts to the local network switch.

In another embodiment, a computer program product for handling local interrupts includes a computer readable storage medium having computer readable program code embodied therewith, the computer readable program code including computer readable, program code configured to receive a request at a DFP system member to route at least one type of interrupt to a DFP system master, computer readable program code configured to send an acknowledgement to the request back to the DFP system master, computer readable program code configured to enable one or more local interrupts that correspond to the at least one type of interrupt to be networked, upon occurrence of the one or more local interrupts: computer readable program code configured to create and send a message signaled interrupt (MSI) to a local processor of the DFP system member, computer readable program code configured to create at least one packet encapsulating details of the one or more local interrupts, and computer readable program code configured to send the at least one packet to at least one registered media access control (MAC) address via a local network switch of the DFP system member to be switched to at least the DFP system master.

In yet another embodiment, a computer program product for handling local interrupts includes a computer readable storage medium having computer readable program code embodied therewith, the computer readable program code including computer readable program code configured to send a request to one or more DFP system members in order to retrieve one or more interrupts from the one or more DFP system members, wherein the one or more interrupts are received as data encapsulated in at least one packet, computer readable program code configured to receive one or more acknowledgements to the request from the one or more DFP system members at a local network switch of the DFP system master, upon receipt of the at least one packet: computer readable program code configured to decode the at least one packet to retrieve details of the one or more interrupts using a dedicated processor of the DFP system master, computer readable program code configured to create and send a MSI comprising the details of the one or more interrupts to a local processor of the DFP system master using the dedicated processor, and computer readable program code configured to read the MSI using the local processor of the DFP system master.

According to another embodiment, a method includes receiving a request at a DFP system member to route at least one type of interrupt to a DFP system master, sending an acknowledgement to the request back to the DFP system master, enabling one or more local interrupts to be networked that correspond to the at least one type of interrupt to route to the DFP system master, upon occurrence of the one or more local interrupts: creating and sending a MSI to a local processor of the DFP system member, creating at least one packet encapsulating details of the one or more local interrupts, and sending the at least one packet to at least one registered MAC address via a local network switch of the DFP system member to be switched to at least the DFP system master.

In yet another embodiment, a method includes sending a request to one or more DFP system members in order to retrieve one or more interrupts from the one or more DFP system members, wherein the one or more interrupts are received as data encapsulated in at least one packet, receiving one or more acknowledgements to the request from the one or more DFP system members at a local network switch of the DFP system master, upon receipt of the at least one packet: decoding the at least one packet to retrieve details of the one or more interrupts using a dedicated processor of the DFP system master, creating and sending a MSI comprising the details of the one or more interrupts to a local processor of the DFP system master using the dedicated processor, and reading the MSI using the local processor of the DFP system master.

Other aspects and embodiments of the present invention will become apparent from the following detailed description, which, when taken in conjunction with the drawings, illustrate by way of example the principles of the invention.

DETAILED DESCRIPTION

Figure 1:
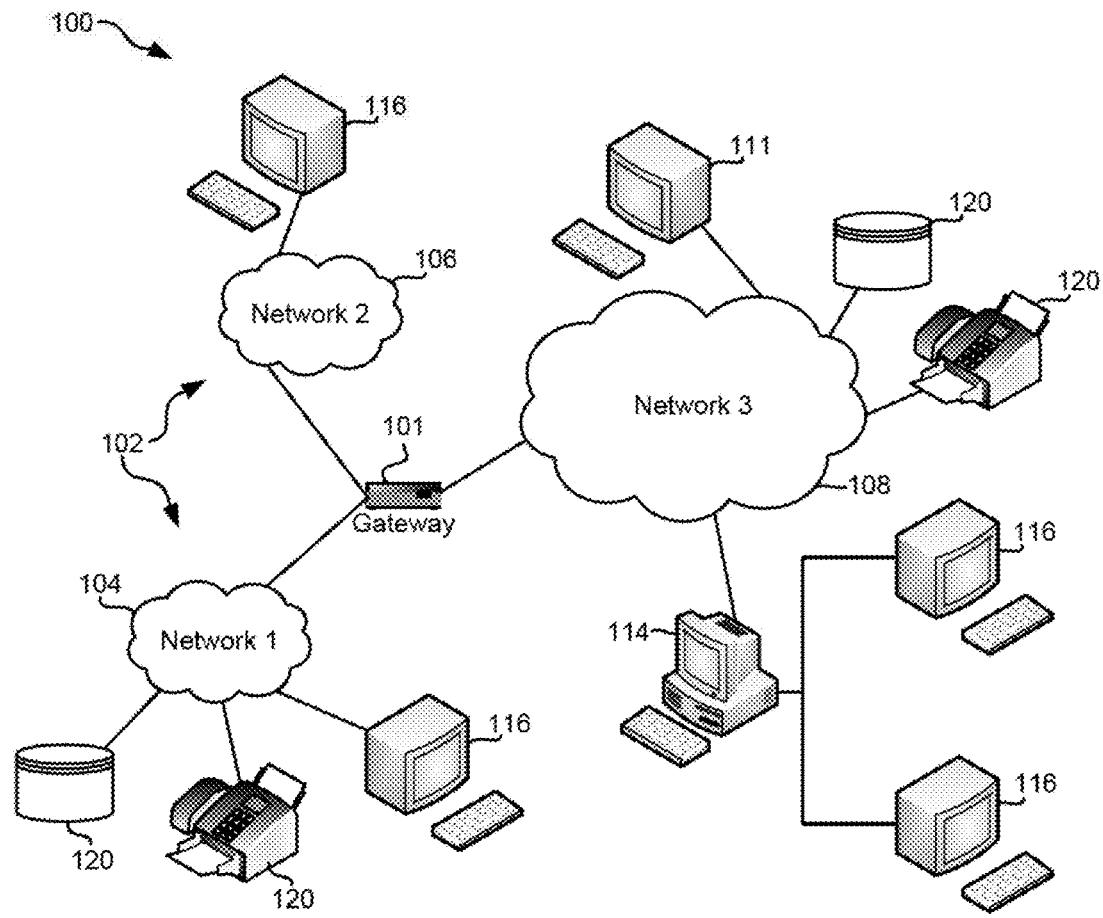
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, a dedicated processor may be provided on each member of a distributed fabric protocol (DFP) system or cluster, with the dedicated processor collecting local interrupts from various sources, generating local interrupts to a local processor, creating messages such as multicast or unicast enhanced layer 2 transport (EL2T) protocol packets encapsulating the interrupt details, and sending the messages out using a local network switch.

In one general embodiment, a system comprises a local processor, a peripheral component interconnect express (PCIe) switch electrically coupled to the local processor, one or more local interrupt sources adapted for creating one or more local events indicating exceptions to normal operation, a dedicated processor electrically coupled to the one or more local interrupt sources and the PCIe switch, and a local network switch electrically coupled to the dedicated processor and the PCIe switch, wherein the dedicated processor is adapted for packaging the one or more local events and sending the packaged events to the local network switch as one or more local interrupts.

In another general embodiment, a computer program product for handling local interrupts includes a computer readable storage medium having computer readable program code embodied therewith, the computer readable program code including computer readable program code configured to receive a request at a DFP system member to route at least one type of event to a DFP system master, computer readable program code configured to send an acknowledgement to the request back to the DFP system master, upon occurrence of the at least one type of event: computer readable program code configured to create and send a message signaled interrupt (MSI) to a local processor of the DFP system member, computer readable program code configured to create at least one packet encapsulating details of the at least one type of event, and computer readable program code configured to send the at least one packet to at least one registered media access control (MAC) address via a local network switch of the DFP system member to be switched to at least the DFP system master.

In yet another general embodiment, a computer program product for handling local interrupts includes a computer readable storage medium having computer readable program code embodied therewith, the computer readable program code including computer readable program code configured to send a request to one or more DFP system members in order to retrieve one or more events from the one or more DFP system members, wherein the one or more events are received as data encapsulated in at least one packet, computer readable program code configured to receive one or more acknowledgements to the request from the one or more DFP system members at a local network switch of the DFP system master, upon receipt of the at least one packet: computer readable program code configured to decode the at least one packet to retrieve details of the one or more events using a dedicated processor of the DFP system master, computer readable program code configured to create and send a MSI comprising the details of the one or more events to a local processor of the DFP system master using the dedicated processor, and computer readable program code configured to read the MSI using the local processor of the DFP system master.

According to another general embodiment, a method includes receiving a request at a DFP system member to route at least one type of event to a DFP system master, sending an acknowledgement to the request back to the DFP system master, upon occurrence of the at least one type of event: creating and sending a MSI to a local processor of the DFP system member, creating at least one packet encapsulating details of the at least one type of event, and sending the at least one packet to at least one registered MAC address via a local network switch of the DFP system member to be switched to at least the DFP system master.

In yet another general embodiment, a method includes sending a request to one or more DFP system members in order to retrieve one or more events from the one or more DFP system members, wherein the one or more events are received as data encapsulated in at least one packet, receiving one or more acknowledgements to the request from the one or more DFP system members at a local network switch of the DFP system master, upon receipt of the at least one packet: decoding the at least one packet to retrieve details of the one or more events using a dedicated processor of the DFP system master, creating and sending a MSI comprising the details of the one or more events to a local processor of the DFP system master using the dedicated processor, and reading the MSI using the local processor of the DFP system master.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX system which virtually hosts a MICROSOFT® WINDOWS® environment, a MICROSOFT WINDOWS system which emulates an IBM z/OS environment, etc. This virtualization and/or emulation may be enhanced through the use of VMWARE® software, in some embodiments. IBM and z/OS are trademarks of International Business Machines Corporation in the United States and other countries. UNIX is a registered trademark of The Open Group in the United States and other countries. Microsoft and Windows are trademarks of Microsoft Corporation in the United States, other countries, or both.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
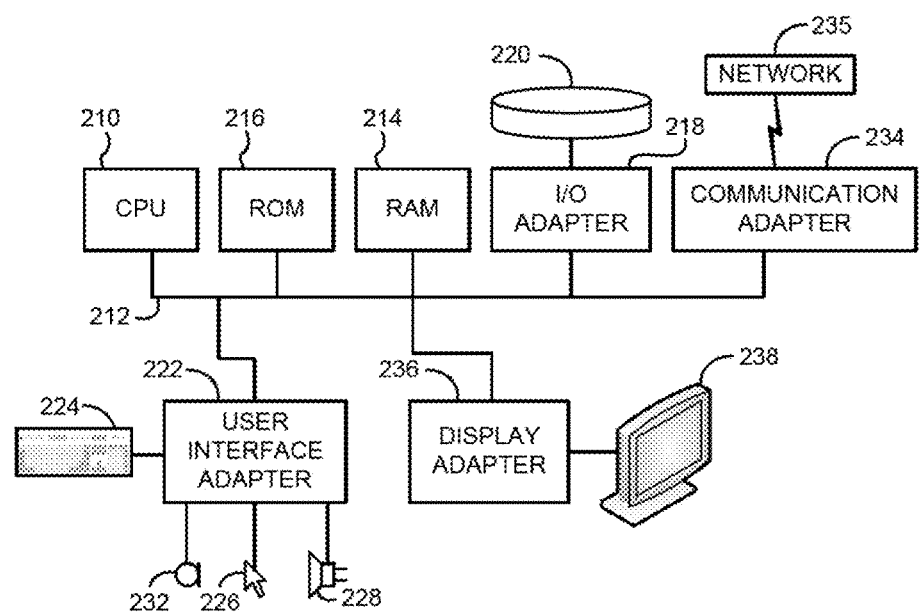
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC® OS, a UNIX OS, etc. It will be appreciated that a preferred embodiment may also be implemented on platforms and operating systems other than those mentioned. A preferred embodiment may be written using JAVA®, XML, C, and/or C++ language, or other programming languages, along with an object oriented programming methodology. Object oriented programming (OOP), which has become increasingly used to develop complex applications, may be used. MAC is a registered trademark of Apple Inc. Oracle and JAVA are registered trademarks of Oracle and/or its affiliates. Other names may be trademarks of their respective owners.

Figure 3:
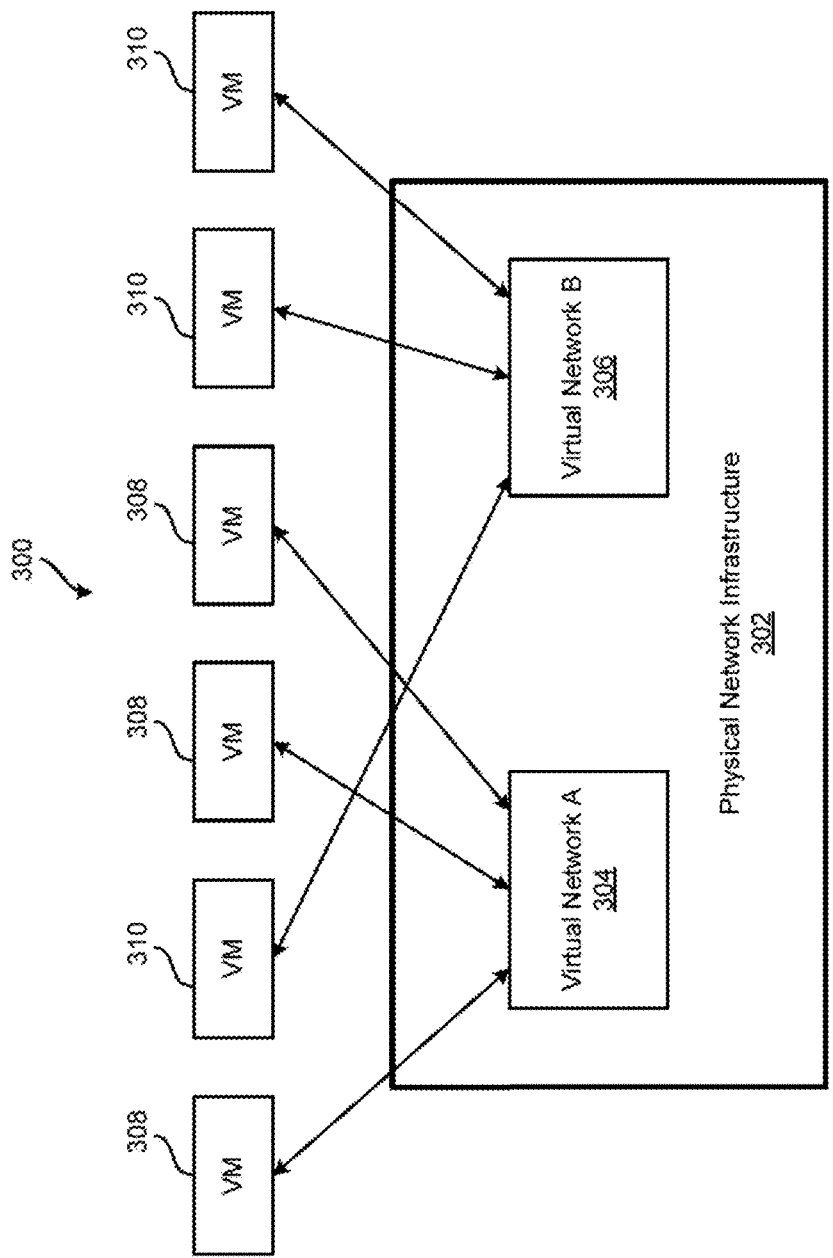
FIG. 3 is a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, a cell-based distributed Fabric Protocol (cDFP) system and/or an Ethernet-based distributed Fabric Protocol (eDFP) system may be virtualized. The overlay network 300, in one approach, comprises one or more virtual networks 304, 306 within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc.

Each virtual network 304, 306 may include any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given tune, but this is certainly not required nor intended to be limiting.

Figure 4:
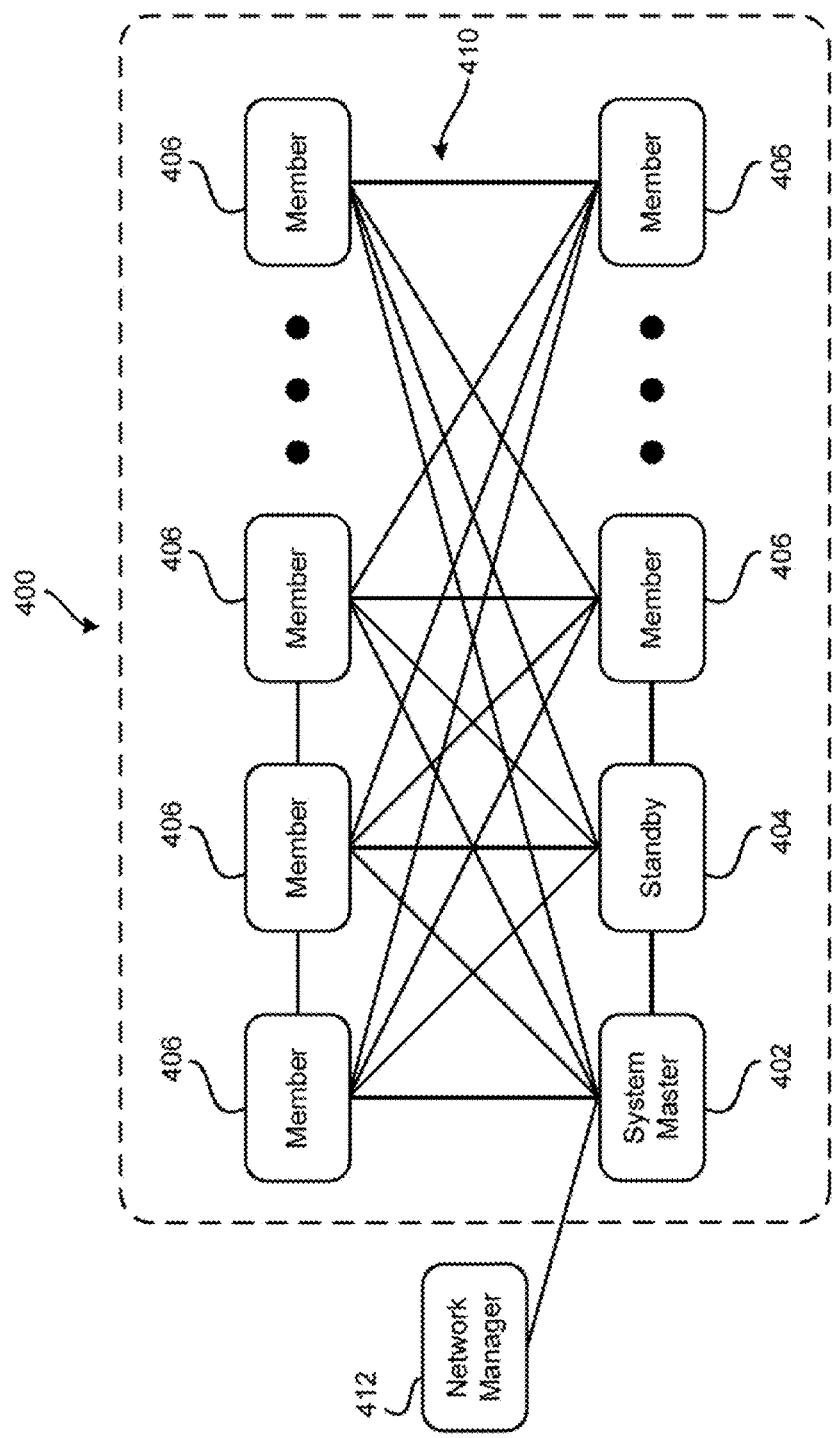
FIG. 4 shows an overview of component connectivity of a cDFP and/or an eDFP, according to one embodiment.

Now referring to FIG. 4, an overview of component connectivity 410 of a cDFP and/or a eDFP (DFP 400) is shown according to one embodiment. The system master 402 is a main controller of the DFP 400. In one embodiment, no other controller may be used in the domain of the DFP 400. In alternate embodiments, other controllers (not shown) may be used to control specific or general functionality of the domain, such as switching, testing, etc. Traffic (data/requests/alerts or the like being sent) from outside of the domain enters the DFP 400 through network manager 412.

The standby device 404 is provided in the DFP 400 so that should connectivity to the system master 402 be lost for any reason, or if the system master 402 fails for any reason, the standby device 404 is adapted to become the system master and provides all functionality of a system master.

The system master 402 is responsible for determining services used for a particular traffic flow (movement of data/requests/alerts or the like through the DFP 400) and redirects it through a series of members 406, as appropriate based on the particular traffic flow involved, as would be understood by one of skill in the art.

In one embodiment, the topology of the DFP 400, being a cell switched Clos, provides high availability of any links/devices on the DFP 400. Connectivity details and cross-sectional bandwidth may be implementation specific and may be determined on an application specific basis, as would be understood by one of skill in the art.

From a networking perspective, the entire domain of the DFP 400 from outside may appear like an end host, where some services are being applied to traffic flows. The backplane of the topology, being a cell switched interface as described before, removes the possibility of endless looping and it efficiently uses the available backplane bandwidth by spreading cells over multiple links for a single destination, according to one embodiment. Individual members 406 may be added/removed in the domain of the DFP 400 without disrupting other services, devices, etc.

According to one embodiment, up to about 800 members may be grouped together in the DFP 400. This allows for about 32,768 Ethernet ports in a single domain of a DFP 400, in one example. In a further embodiment, with the architecture described herein, according to various embodiments, constant latency of about 2.5 microseconds or less is possible along with the large number of Ethernet ports possible in one traffic management domain. In one example, the DFP 400 may be envisioned as a single switch having over 32,000 Ethernet ports.

Accordingly, in addition to integrating the plurality of Ethernet ports into the DFP 400, all of the requirements of a data center are also integrated into the DFP 400, in some embodiments. Therefore, if a new extremely low latency, flat data center is being initiated, the DFP 400 helps with virtualization, because most of the virtualized data centers, especially hypervisor-based servers, nun a plurality of VMs. By having a "flat switch" architecture, the plurality of VMs may move data across the architecture easily and efficiently. It is very difficult for VMs, generally, to move across layer 3-domains, between one subnet to another subnet, internet protocol (IP) subnet to IP subnet, etc. But if the architecture is similar to a large flat switch, in a very large layer 2-domain, then the VMs are aided in their attempt to move data across the architecture.

Figure 5:
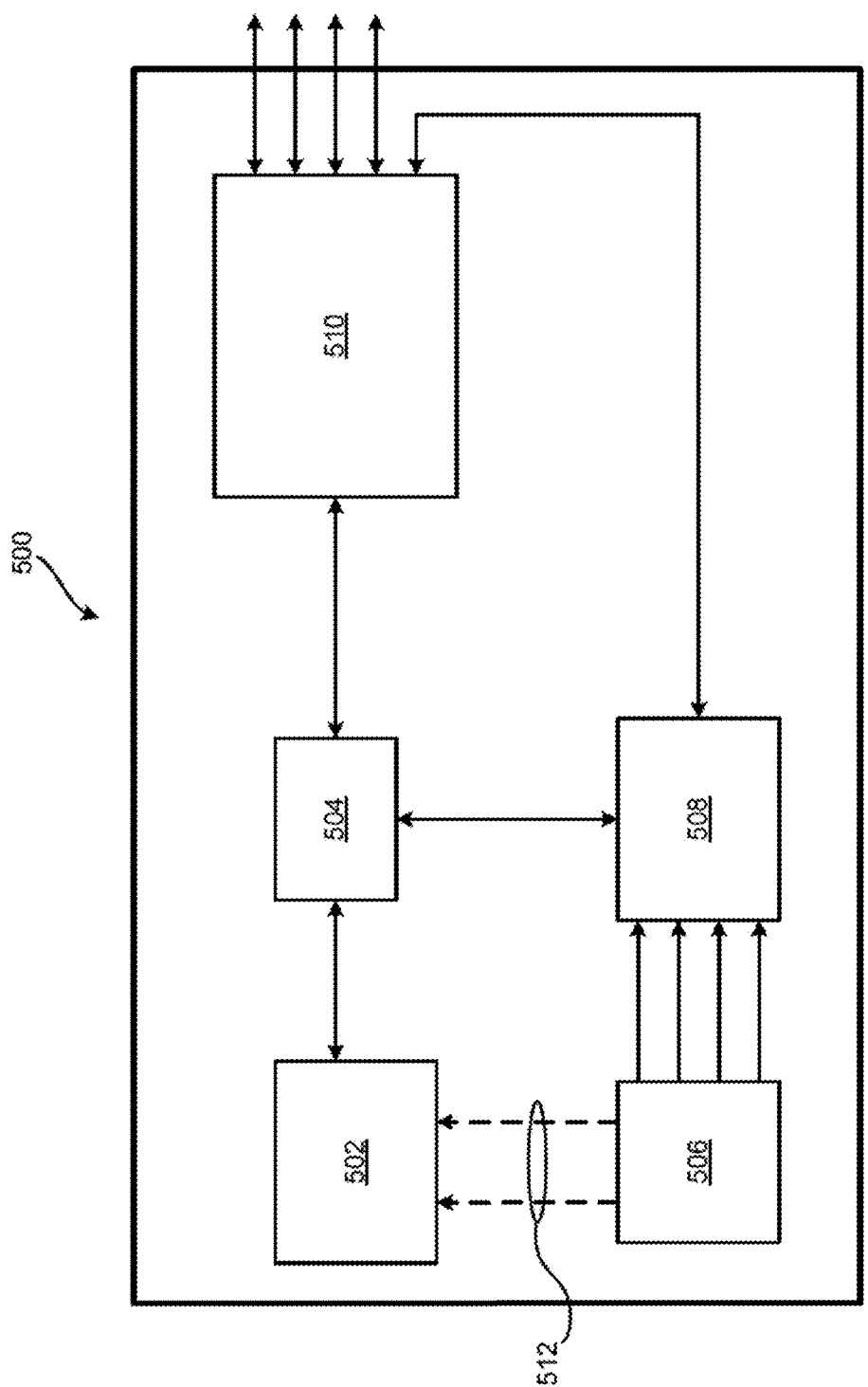
FIG. 5 is a simplified system block diagram, according to one embodiment.

With reference to FIG. 5, a system block diagram of a system 500 is shown according to one embodiment. The system 500 may be a system master, a DFP system member, or a standby, according to various embodiments. Of course, other components, modules, logic, circuits, etc., that are not specifically shown in FIG. 5 may be included in the system 500 in various approaches, such as a fan, a fan controller, a motherboard, wiring, interconnects, a power supply unit, etc.

A system master typically controls a DFP system, while DFP system members receive instructions from the system master and comply with instructions/requests from the system master. The standby operates like a member, until communication is lost with the system master for some reason, in which case the standby becomes the system master and functions accordingly.

The system 500 comprises a local processor 502, a peripheral component interconnect express (PCIe) switch 504, one or more local interrupt sources 506, a dedicated processor 508, and a local network switch 510. Each component of the system 500 is described in more detail below.

The local processor 502 is electrically coupled to the PCIe switch 504, in some approaches. The local processor 502 may comprise one or more of any of the following: a central processing unit (CPU), an integrated circuit (IC), a field programmable gate array (FPGA), an application specific integrated circuit (ASIC), a microcontroller, or any other suitable processor. In one embodiment, the local processor 502 may be a local CPU adapted for controlling operations of the system 500 including handling the one or more local events produced by the one or more local interrupt sources 506 by pre-installing appropriate Interrupt Service Routines (ISRs).

The PCIe switch 504 is electrically coupled to the local processor 502, the dedicated processor 508, and the local network switch 510, in one approach. Any suitable connectors as known in the art may be used for interconnection of the various components. In one embodiment, the local processor 502 may become a PCIe master to the dedicated processor 508 over the PCIe switch 504. The local processor 502 exposes some of the local processor's programmable registers to the local master for programming the local processor 502. The local processor 502 maps various message signaled interrupts (MSIs) from the dedicated processor 508 into the local address space. These MSIs include events generated by local sources and events generated by remote sources on DFP member switches.

The PCIe switch 504 may comprise any suitable switch device and/or processor as would be understood by one of skill in the art upon reading the present descriptions. The PCIe switch 504 may be adapted for switching protocols and devices beyond only PCIe-based protocols and devices in some approaches.

In one approach, the PCIe switch 504 may comprise multiple PCIe bus connections that serve one or more PCIe buses or other buses using different protocols.

The one or more local interrupt sources 506 may include any device, module, component, and/or logic that may produce or create an event indicating an exception to normal operation. Some events need to be dealt with immediately, while some exceptions may be disregarded and/or are for notification purposes only. The events that need to be dealt with immediately or as soon as possible should be dealt with by the local processor 502 in order to manage the system 500 effectively. However, according to embodiments described herein, these events may be sent to a DFP master which is adapted to handle these events.

Some examples of interrupt sources include a fan or fan controller, a power supply unit, a temperature indicator or logic interpreting the temperature indicator, insertion or removal of various hotswap capable devices, etc. The one or more local events 506 are provided to and interpreted by the dedicated processor 508 in one embodiment.

Some of the local interrupt sources may provide events over PCIe bus via MSI, some may provide events directly to the local processor 502 via hard coding, some may provide events via I²C protocol, etc., according to various embodiments. However, each event which is provided may be routed to the dedicated processor 508 in order to be routed to an external device, such as a DFP system master, in one approach.

The dedicated processor 508 may be electrically coupled to the PCIe switch 504 and to the local network switch 510. Any suitable connectors as known in the art may be used for interconnection of the components. Also, the one or more local interrupt sources 506 may be electrically coupled to the dedicated processor 508 such that the dedicated processor 508 is capable of receiving events from the one or more local interrupt sources 506 according to some approaches.

The dedicated processor 508, which is typically not provided in conventional switches, is adapted for collecting local events from the local interrupt sources 506. Also, it is adapted for generating one or more events to the local processor 502 based on the one or more local events received from the local interrupt sources 506 and creating multicast or unicast EL2T packets encapsulating details of the one or more local events. These EL2T packets are then sent to the local network switch 510. The dedicated processor May comprise any suitable processor such as a CPU, an IC, an ASIC, a microcontroller, and/or a FPGA.

In addition, in one embodiment, the dedicated processor 508 may be adapted for packaging the one or more local events and sending the packaged events to the local network switch 510. Furthermore, the dedicated processor 508 may be a FPGA and the packets may be EL2T protocol packets. Of course, other protocols as known in the art may be used for encapsulating the details of the local events received from the local interrupt sources 506.

Details of the local events may include the switch ID of the DFP system member, the event source, the event type, the event priority, among other details not specifically mentioned but would be understood by one of skill in the art upon reading the present descriptions.

In one embodiment, the dedicated processor 508 may be a FPGA adapted for generating local events to the local processor 502, creating multicast or unicast EL2T packets encapsulating details of the local events, and sending the EL2T packets to the local network switch 510.

The local network switch 510 is electrically coupled to the PCIe switch 504 and the dedicated processor 508. Any suitable connectors known in the art may be used for interconnection of the components. The local network switch 510 may switch any communication protocol known in the art, including but not limited to Ethernet, PCIe, PCIe-over-Ethernet, Fiber Channel (FC), Fiber Channel-over-Ethernet (FCoE), etc. The connection between the dedicated processor 508 and the local network switch 510 may be a local network port (which would constitute an independent VLAN), according to one approach. Of course, depending on the type of network switch, some other connection type known in the art may be used.

In one embodiment, the local network switch 510 may comprise an ASIC, such as a packet switching ASIC (e.g., a BROADCOM model BCM88650) or some other suitable packet switching ASIC known in the art.

The local network switch 510 is adapted for receiving data, information, and/or packets from internal components (e.g., the dedicated processor 508, the PCIe switch 504, etc.) to be sent out to devices outside of the system 500. Also, it is adapted for sending these packets to the devices outside of the system 500 and for receiving packets from the devices outside of the system 500. The local network switch 510 is then adapted for sending these received packets from outside of the system 500 to the proper internal components (e.g., the dedicated processor 508, the PCIe switch 504, etc.).

According to one embodiment, the dedicated processor 508 may collect events that would normally be sent directly to the local processor 502, as indicated by connections 512. These connections 512 may remain in the system 500, according to some embodiments, or may not be present, in various embodiments.

For example, the local network switch 510 may be adapted for receiving packets from the dedicated processor 508 and/or the PCIe switch 504 (internal packets) to be sent outside of the system 500 and sending the internal packets to an external device, and receiving packets from the external device (external packets) and sending the external packets to the dedicated processor 508 and/or the PCIe switch 504, among other functionality not specifically described herein but understood by one of skill in the art upon reading the present descriptions.

If a problem arises in the communication of the local events to the dedicated processor 508, to the local network switch 510, or anywhere else in the network, as explained in more detail later, the local events may be sent to the local processor 502 using these connections 512, or via the dedicated processor 508 via the PCIe switch 504, in other approaches, so that the local processor 502 may interpret the events (e.g., read the event to determine the deviation from normal operation) and handle the events, such as by changing conditions, starting or stopping a component, alerting a user to a problem, etc. This may be accomplished by pre-installing appropriate ISRs.

In another embodiment, when the system 500 is a standby or member of a DFP system, the local network switch 510 may be adapted for sending the multicast or unicast packets encapsulating details of the one or more local events to a DFP system master, and at the same time sending corresponding MSI to the local processor 502 via the PCIe switch 504. If the local processor 502 is in DFP member mode, it does not respond to the MSI but just counts the number of events.

According to another embodiment, the local network switch 510 may be a packet switching ASIC, and may be adapted for receiving packets from the dedicated processor 508 (internal packets) to be sent outside of the system 500 and sending the internal packets to an external device. The local network switch 510 may also be adapted for receiving packets from the external device (external packets) and sending the external packets to the dedicated processor 508, according to this embodiment.

According to another embodiment, when the system 500 is a DFP system master, the local processor 502 may be a CPU adapted for controlling operations of the system 500 including handling the one or more local events and for analyzing and responding to external events (received through the local network switch 510 to the dedicated processor 508), such as by pre-installing appropriate ISRs. Furthermore, the dedicated processor 508 may be adapted for generating one or more events to the local processor 502 based on the one or more local events received from the local interrupt sources 506 (to manage its own system), receiving multicast or unicast packets encapsulating details of external events (from DFP system members) from the dedicated processor 508, forwarded by the local network switch 510, and decoding the multicast or unicast packets to determine details of the external events. In addition, in some approaches, the local network switch 510 may be a packet switching ASIC and may be adapted for receiving the multicast or unicast packets encapsulating details of the external events from one or more DFP system members which generated the external events.

In another embodiment, where the system 500 is a DFP system master, the dedicated processor 508 may be adapted for receiving multicast or unicast EL2T protocol packets encapsulating details of external events (from DFP system members) from the local network switch 510, the dedicated processor 508 may be adapted for decoding the multicast or unicast EL2T packets to determine details of the external events encapsulated in the multicast or unicast EL2T packets, the dedicated processor 508 may be adapted for sending an MSI-based message to the local processor 502 including details of the external events, the local network switch 510 may be adapted for receiving the multicast or unicast EL2T packets encapsulating details of the external events from one or more DFP system members which generated the external events, and the local processor 502 may be adapted for reading and responding to the external events.

As mentioned earlier, the block diagram shown in FIG. 5 applies equally to member systems, standby systems, and system masters, according to various embodiments. Next, descriptions are provided of logic and functionality that may occur on members, standbys, and system masters, according to various embodiments.

Figure 6:
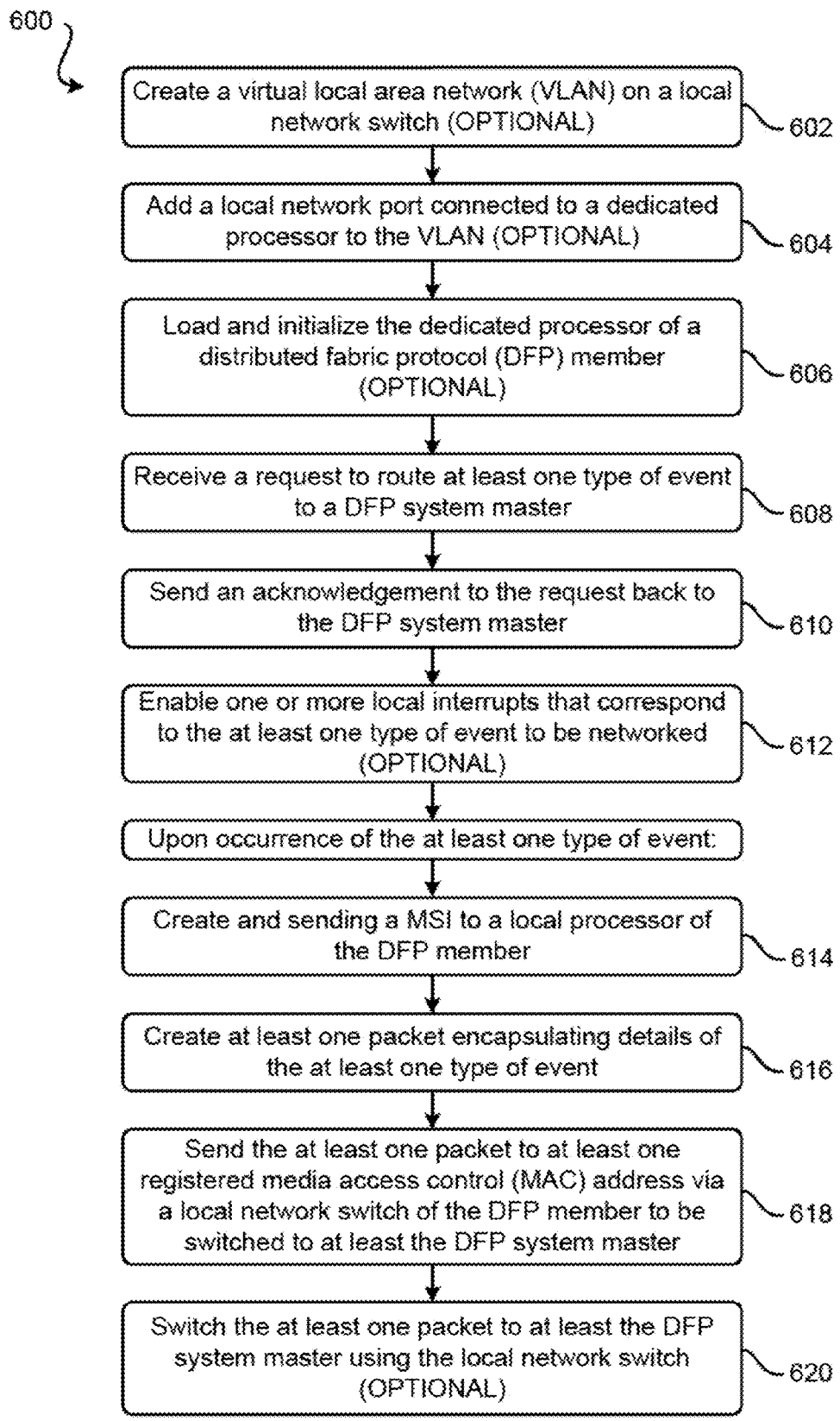
FIG. 6 is a flowchart of a method, according to one embodiment.

Now referring to FIG. 6, a flowchart of a method 600 is shown, according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a member of a DFP, in one approach, as described herein in more detail.

Optional operations described below are those operations which may be omitted, or may be performed once while other operations are performed multiple times, or may be performed by other entities are systems and relied upon by other operations, according to various embodiments.

As shown in FIG. 6, method 600 may initiate with optional operation 602, where a VLAN is created on a local network switch, in one approach. Any suitable VLAN may be created, such as VLAN 4095, VLAN 4096, or some other predefined VLAN ID.

In one embodiment, the local network switch may be a packet switching ASIC, or some other suitable packet switching processor known in the art.

In optional operation 604, a local network port connected to a dedicated processor (such as a dedicated processor of the DFP system member) is added to the VLAN. This functionality may be accomplished using the local network switch in one approach.

In one approach, the dedicated processor may be a FPGA adapted for at least performing the functionality described for the dedicated processor in method 600.

In optional operation 606, the dedicated processor (such as a dedicated processor of the DFP system member) is loaded and initialized. Of course, any other associated actions may also be taken as would be understood by one of skill in the art upon reading the present descriptions.

In a further embodiment, optional operations 602-606 may be performed at system boot up of a DFP system member comprising the local network switch.

In operation 608, the dedicated processor receives a request at a DFP system member to route at least one type of event to an entity other than a local processor of the DFP system member, such as to a system master of the DFP system which the member belongs to. This request may be initiated by the DFP system master, and may be responded to by the DFP system member or ignored. If ignored, the DFP system member will not be integrated fully into the DFP system.

In operation 610, an acknowledgement to the request is sent, such as back to the DFP system master. The acknowledgement may include information, such as identifying information, location information, usage information, etc. Furthermore, the acknowledgement may be sent by the dedicated processor, in one approach.

In optional operation 612, one or more corresponding local interrupts are enabled to be networked (via MSI to the local network switch). This may be performed by the dedicated processor, in one approach, or any other suitable component, device, and/or logic. The source MAC address of a sender for each type of local event is maintained, and each local event may be sent to multiple MAC addresses one at a time. Each type of local event may correspond to one unique multicast MAC address, if multicast is preferred.

In operation 614, when the at least one type of event occurs (e.g., upon occurrence of the one or more local interrupts), an MSI-based message is created and sent to a local processor of the DFP system member. This MSI-based message may include details about the at least one type of event. This operation may be performed by the dedicated processor or some other suitable component, device, and/or logic.

In operation 616, a packet, such as an EL2T packet or some other suitable communication packet type, is created, and details of the at least one type of event are stored in a payload of the packet. Also included in the payload is a switch ID of the DFP system member in the DFP system. The DFP system member switch ID may be preprogrammed in the DFP system member, decided by and provided by the DFP system master, etc.

In more approaches, details that may be stored to the packet include, but are not limited to, the switch ID of the DFP system member, the event source, the event type, the event priority, and/or the MSI payload, among other details not specifically mentioned but would be understood by one of skill in the art upon reading the present descriptions.

In operation 618, the packet, such as the EL2T packet, is sent to at least one registered media access control (MAC) address via the network port connected to the local network switch of the DFP system member to be switched to at least the DFP system master. This sending may be performed by the dedicated processor, in one approach, or some other suitable device, logic, etc. This EL2T packet may be sent via MSI, in one approach, or some other suitable communication protocol known in the art.

In optional operation 620, the packet, such as the EL2T packet, may be switched, such as over the local network switch as per a layer 2 unicast forwarding database, to its intended destination (e.g., the DFP system master). Of course, other switching actions may be performed, such as multicast switching, and switching to multiple destinations, such as in response to multiple requests for events.

According to several embodiments, the method 600 may be performed using a dedicated processor of the DFP system member, the dedicated processor may be a FPGA, and/or the at least one packet may be an EL2T protocol packet.

In another embodiment, the at least one packet may include a switch ID of the DFP system member, and an event source, an event type, an event priority, and a MSI payload for each of the one or more local, events. Of course, it may include more details/information than that specifically described herein, as would be understood by one of skill in the art upon reading the present descriptions.

According to various embodiments, the method 600 may be performed by a system, computer, or some other device capable of executing commands, logic, etc.

In one such embodiment, a computer program product for handling local events comprises a computer readable storage medium having computer readable program code embodied therewith. The computer readable program code comprises: computer readable program code configured to receive a request at a DFP system member to route at least one type of event to a DFP system master; computer readable program code configured to send au acknowledgement to the request back to the DFP system master; computer readable program code configured to enable one or more local events that correspond to the at least one type of event to be networked; upon occurrence of the one or more local events: computer readable program code configured to create and send an MSI-based message to a local processor of the DFP system member; computer readable program code configured to create at least one packet encapsulating details of the one or more local events; and computer readable program code configured to send the at least one packet to at least one registered MAC address via a local network switch of the DFP system member to be switched to at least the DFP system master.

In a further embodiment, the computer program product may further comprise: computer readable program code configured to create a VLAN on the local network switch; computer readable program code configured to add a local network port connected to the dedicated processor to the VLAN; and computer readable program code configured to load and initialize a dedicated processor of the DFP system member upon start up of the DFP system member.

Figure 7:
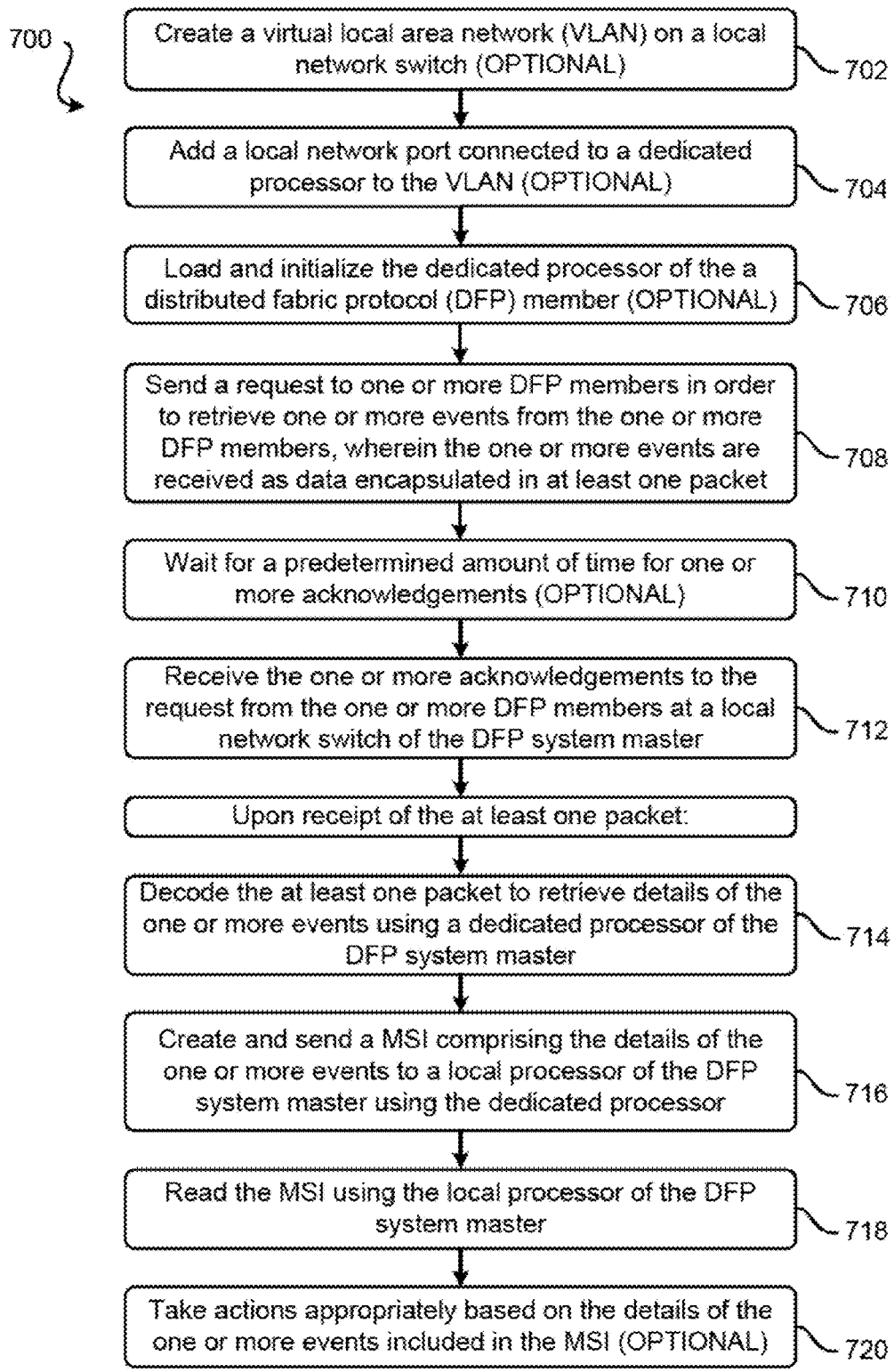
FIG. 7 is a flowchart of a method, according to one embodiment.

Now referring to FIG. 7, a flowchart of a method 700 is shown, according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a DFP system master, in one approach, as described in detail herein.

Optional operations described below are those operations which may be omitted, or may be performed once while other operations are performed multiple times, or may be performed by other entities are systems and relied upon by other operations, according to various embodiments.

As shown in FIG. 7, method 700 may initiate with optional operation 702, where a VLAN is created on a local network switch (such as of the DFP system master), in one approach. Any suitable VLAN may be created, such as VLAN 4095, VLAN 4096, or some other predefined VLAN ID.

In one embodiment, the local network switch may be a packet switching ASIC, or some other suitable packet switching processor. In a further embodiment, optional operation 702 may be performed at system boot up of a DFP system master comprising the local network switch.

In optional operation 704, a local network port connected to a dedicated processor (such as of the DFP system master) is added to the VLAN. This functionality may be accomplished using the local network switch or any other suitable device.

In one approach, the dedicated processor may be a FPGA adapted for at least performing the functionality described for the dedicated processor in method 700.

In optional operation 706, the dedicated processor is loaded and initialized. Of course, any other associated actions, as would be understood by one of skill in the art upon reading the present descriptions, may be performed.

These operations 702-706 may be performed upon boot up of the DFP system master, in some approaches.

In operation 708, a request is sent to one or more DFP system members in order to retrieve one or more events from the one or more DFP system members. In one approach, the request may be initiated by a local processor of the DFP system master. The local processor may comprise one or more of any of the following: a CPU, an IC, a FPGA, an ASIC, or any other suitable processor.

In another embodiment, each DFP system member may determine which events to send to the DFP system master. Furthermore, in one approach, the one or more events may be received as data encapsulated in at least one packet, such as an EL2T protocol packet.

In another embodiment, the request may be a multicast EL2T packet which includes a request for various events. The events may be represented by a 64-bit array, a 128-bit array, a 256-bit array, etc. Each bit may indicate an event type or some other piece of information or event detail.

In optional operation 710, the one or more acknowledgements may be waited on for a predetermined amount of time, for a certain period of time after a last acknowledgement is received, etc. Once that time period has passed, it may be considered that all acknowledgements have been received.

According to one embodiment, the one or more acknowledgements may be sent from DFP system members of the DFP system for which the DFP system master is a master.

In operation 712, the local processor receives one or more acknowledgements to the request (such as from the one or more DFP system members at a local network switch of the DFP system master).

In one embodiment, each acknowledgement may include a packet, such as an EL2T packet, which includes details about one or more events for the DFP system member which sent the acknowledgement.

In operation 714, when a packet is received (e.g., upon receipt of the at least one packet), the at least one packet is decoded to retrieve details of the one or more events. In one approach, the dedicated processor (such as of the DFP system master) may perforin the decoding.

According to some approaches, the details that may be included in the packet include, but are not limited to, the switch ID of the DFP system member reporting the events, and for each event reported: the event source, the event type, the event priority, and/or the MSI payload, among other details not specifically mentioned but would be understood by one of skill in the art upon reading the present descriptions.

In operation 716, an MSI-based message is created and sent to the local processor. This MSI-based message may be created comprising the details of the one or more events and sent to the local processor (such as of the DFP system master) by the dedicated processor or some other suitable component, device, and/or logic, etc. The MSI message that is generated by the dedicated processor and sent to the local processor includes the details of the local events that were decoded from the packet.

In operation 718, the local processor (such as of the DFP system master) reads the MSI-based message, such as to determine the event details.

In optional operation 720, the local processor (such as of the DFP system master) takes any actions appropriately based on the details of the one or more events included in the MSI-based message.

One such action may be to instruct the DFP system member to perform some corrective action, preventative action, responsive action, etc. Another such action may be to perform an action on the DFP system master, such as sending a message, instruction, request, etc., to one or more DFP system members. Another possible action may be to restart, boot up, shut down, or in some other way affect the operation of a DFP system member or a component of a DFP system member. Of course, any other actions may be taken as would be understood by one of skill in the art upon reading the present descriptions.

In some approaches, the dedicated processor may be a FPGA, and/or the at least one packet may be an EL2T protocol packet.

In a further embodiment, the at least one packet may include a switch ID of the DFP system member, and an event source, an event type, an event priority, and a MSI payload for each of the one or more events included in the at least one packet.

According to various embodiments, the method 700 may be performed by a system, computer, or some other device capable of executing commands, logic, etc.

In one such embodiment, a computer program product for handling local events comprises a computer readable storage medium having computer readable program code embodied therewith. The computer readable program code comprises: computer readable program code configured to send a request to one or more DFP system members in order to retrieve one or more events from the one or more DFP system members, wherein the one or more events are received as data encapsulated in at least one packet; computer readable program code configured to receive one or more acknowledgements to the request from the one or more DFP system members at a local network switch of the DFP system master; upon receipt of the at least one packet: computer readable program code configured to decode the at least one packet to retrieve details of the one or more events using a dedicated processor of the DFP system master; computer readable program code configured to create and send an MSI-based message comprising the details of the one or more events to a local processor of the DFP system master using the dedicated processor; and computer readable program code configured to read the MSI-based message using the local processor of the DFP system master.

In a further embodiment, the computer program product may further comprise: computer readable program code configured to create a VLAN on the local network switch; computer readable program code configured to add a local network port connected to the dedicated processor to the VLAN; computer readable program code configured to load and initialize the dedicated processor of the DFP system master upon start up of the DFP system master; computer readable program code configured to wait for a predetermined amount of time for the one or more acknowledgements; and computer readable program code configured to take actions appropriately based on the details of the one or more events included in the MSI-based message.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a local processor;
a peripheral component interconnect express (PCIe) switch electrically coupled to the local processor;
one or more local interrupt sources configured to create one or more local events indicating exceptions to normal operation;
a local network switch electrically coupled to the PCIe switch, the local network switch being configured to:
receive packets encapsulating details of external events from devices outside of the system which generated the external events;
forward the packets to a dedicated processor; and
receive packets from internal components to be sent out to the devices outside of the system; and
the dedicated processor electrically coupled to the one or more local interrupt sources, the local network switch, and the PCIe switch, the dedicated processor being configured to:
package the one or more local events;
send the packaged events to the local network switch as one or more local interrupts;
receive the packets encapsulating details of external events forwarded by the local network switch;
decode the packets to determine details of the external events encapsulated in the packets; and
send one or more message signaled interrupts (MSIs) to the local processor based on the details of the external events,
wherein the one or more local events are not sent directly to the local processor by the one or more local interrupt sources when the one or more local events are successfully sent to the dedicated processor, and
wherein the one or more local events are sent to the local processor when a problem arises in communication of the one or more local events to the dedicated processor.

2. The system as recited in claim 1, wherein the system is either a member of a distributed fabric protocol (DFP) system, a DFP system master, or a DFP standby.

3. The system as recited in claim 1, wherein the local processor is a central processing unit (CPU) configured to control operations of the system including handling the one or more local interrupts.

4. The system as recited in claim 1, wherein the dedicated processor is further configured to:
generate one or more interrupts to the local processor based on the one or more local events received from the local interrupt sources;
create multicast or unicast packets encapsulating details of the one or more local events; and
send the multicast or unicast packets to the local network switch.

5. The system as recited in claim 4, wherein the dedicated processor is a field programmable gate array (FPGA) and the packets are enhanced layer 2 transport (EL2T) protocol packets.

6. The system as recited in claim 4, wherein the local network switch is configured to send the multicast or unicast packets encapsulating details of the one or more local events to a remote distributed fabric protocol (DFP) system master.

7. The system as recited in claim 1, wherein the local network switch is a packet switching application specific integrated circuit (ASIC), and is configured to:
receive internal packets from the dedicated processor to be sent outside of the system and sending the internal packets to an external device;
receive external packets from the external device; and
send the external packets to the dedicated processor.

8. The system as recited in claim 1,
wherein the dedicated processor is a field programmable gate array (FPGA),
wherein the dedicated processor is configured to create multicast or unicast enhanced layer 2 transport (EL2T) protocol packets encapsulating details of the one or more local events received from the one or more local interrupt sources,
wherein the dedicated processor is configured to send the multicast or unicast EL2T packets to the local network switch, and
wherein the local network switch is configured to send the multicast or unicast EL2T packets encapsulating details of the one or more local events to a distributed fabric protocol (DFP) system master.

9. The system as recited in claim 1, wherein the local processor is a central processing unit (CPU) configured to:
control operations of the system including handling the one or more local interrupts; and
handle external interrupts from external sources.

10. The system as recited in claim 1, wherein the dedicated processor is configured to:
generate one or more interrupts to the local processor based on the one or more local events received from the local interrupt sources;
receive multicast or unicast packets encapsulating details of external events forwarded by the local network switch;
decode the multicast or unicast packets to determine details of the external events; and
generate local interrupts to the local processor.

11. The system as recited in claim 10, wherein the local network switch is a packet switching application specific integrated circuit (ASIC), and is configured to receive the multicast or unicast packets encapsulating details of the external events from one or more distributed fabric protocol (DFP) system members which generated the external events.

12. The system as recited in claim 1,
wherein the dedicated processor is a field programmable gate array (FPGA),
wherein the local network switch is configured to:
receive multicast or unicast enhanced layer 2 transport (EL2T) protocol packets encapsulating details of external events from one or more distributed fabric protocol (DFP) system members which generated the external events; and
forward the multicast or unicast EL2T protocol packets to the dedicated processor,
wherein the dedicated processor is further configured to:
receive the multicast or unicast EL2T protocol packets encapsulating details of external events forwarded by the local network switch;
decode the multicast or unicast EL2T packets to determine details of the external events encapsulated in the multicast or unicast EL2T packets; and
send one or more message signaled interrupts (MSIs) to the local processor based on the details of the external events,
wherein the local network switch is a packet switching application specific integrated circuit (ASIC), and
wherein the local processor is configured to handle the external events by pre-installing appropriate Interrupt Service Routines (ISRs).

13. The system as recited in claim 1, wherein the dedicated processor is further configured to:

store a source media access control (MAC) address of a sender for each type of local event;

create multicast packets encapsulating details of the one or more local events, wherein each type of local event corresponds to one unique multicast MAC address;

send the multicast packets to the local network switch via message signaled interrupt (MSI); and broadcast the multicast packets to one or more remote devices using the local network switch.

14. The system as recited in claim 1, wherein the local network switch is configured to:

receive multicast or unicast enhanced layer 2 transport (EL2T) protocol packets encapsulating details of external events from one or more remote devices which generated the external events; and forward the multicast or unicast EL2T protocol packets to the dedicated processor.

15. The system as recited in claim 14, wherein the dedicated processor is further configured to:

receive the multicast or unicast EL2T protocol packets encapsulating details of external events forwarded by the local network switch;

decode the multicast or unicast EL2T packets to determine details of the external events encapsulated in the multicast or unicast EL2T packets; and send one or more message signaled interrupts (MSIs) to the local processor based on the details of the external events.

* * * * *